US011508374B2

(12) United States Patent
Abou Antoun et al.

(10) Patent No.: US 11,508,374 B2
(45) Date of Patent: Nov. 22, 2022

(54) VOICE COMMANDS RECOGNITION METHOD AND SYSTEM BASED ON VISUAL AND AUDIO CUES

(71) Applicant: KRYSTAL TECHNOLOGIES, Laval (CA)

(72) Inventors: Andrew Abou Antoun, Laval (CA); Andrew Osaro Idehen, Montreal (CA)

(73) Assignee: KRYSTAL technologies, Laval (CA)

( * ) Notice: Subject to any disclaimer, the term of this patent is extended or adjusted under 35 U.S.C. 154(b) by 441 days.

(21) Appl. No.: 16/719,291

(22) Filed: Dec. 18, 2019

(65) Prior Publication Data
US 2020/0193998 A1 Jun. 18, 2020

Related U.S. Application Data

(60) Provisional application No. 62/781,589, filed on Dec. 18, 2018.

(51) Int. Cl.
*G10L 15/24* (2013.01)
*G10L 15/25* (2013.01)
(Continued)

(52) U.S. Cl.
CPC ............ *G10L 15/25* (2013.01); *G06N 3/04* (2013.01); *G06N 3/08* (2013.01); *G06T 17/00* (2013.01);
(Continued)

(58) Field of Classification Search
CPC ......... G10L 15/25; G10L 15/24; G10L 15/16; G10L 2015/227; G10L 15/22;
(Continued)

(56) References Cited

U.S. PATENT DOCUMENTS 6,400,828 B2 * 6/2002 Covell ................. G06V 10/757
345/619
7,518,631 B2 * 4/2009 Hershey ................. G10L 15/26
348/14.1
(Continued)

OTHER PUBLICATIONS

Thein etal, "Features Point Extraction Based on Lip Movement for Lip Reading System", Jul. 2018, International Journal of Information Technology (IJIT). Jul. 2018;4(4).*
(Continued)

*Primary Examiner* — Olujimi A Adesanya
(74) *Attorney, Agent, or Firm* — Praxis

(57) ABSTRACT

A method and system for voice commands recognition. The system comprises a video camera and a microphone producing an audio/video recording of a user issuing vocal commands and at least one processor connected to the video camera and the microphone. The at least one processor has an associated memory having stored therein processor executable code causing the processor to perform the steps of: obtain the audio/video recording from the video camera and the microphone; extract video features from the audio/video recording and store the result in a first matrix; extract audio features from the audio/video recording and store the result in a second matrix; apply a speech-to-text engine to the audio portion of the audio/video recording and store the resulting syllables in a text file; and identify via a neural network the vocal commands of the user based on the first matrix, the second matrix and the text file.

9 Claims, 3 Drawing Sheets

(51) Int. Cl.
*G10L 15/22* (2006.01)
*G10L 15/16* (2006.01)
*G06T 17/00* (2006.01)
*G10L 25/24* (2013.01)
*G06N 3/04* (2006.01)
*G06N 3/08* (2006.01)
*G06V 40/16* (2022.01)

(52) U.S. Cl.
CPC ............ *G06V 40/171* (2022.01); *G10L 15/16* (2013.01); *G10L 15/22* (2013.01); *G10L 25/24* (2013.01); *G10L 2015/223* (2013.01)

(58) Field of Classification Search
CPC ......... G10L 2015/223; G10L 2021/105; G10L 21/0356; G10L 25/24; G10L 15/02; G10L 15/26; G10L 15/063; G10L 25/57; G10L 25/30; G10L 15/187
See application file for complete search history.

(56) References Cited

U.S. PATENT DOCUMENTS

| | | | | |
|---|---|---|---|---|
| 9,916,832 | B2* | 3/2018 | Mozer ................. | G06V 40/16 |
| 9,922,640 | B2* | 3/2018 | Rao ..................... | G10L 15/04 |
| 10,964,326 | B2* | 3/2021 | Lane ................... | G06K 9/629 |
| 11,238,885 | B2* | 2/2022 | Mittal .................. | G06T 7/11 |
| 11,257,493 | B2* | 2/2022 | Vasconcelos ........ | G06V 10/768 |
| 2002/0161582 | A1* | 10/2002 | Basson ................ | G10L 21/06 704/E21.02 |
| 2003/0018475 | A1* | 1/2003 | Basu ................... | G06V 40/161 704/E11.003 |
| 2003/0212552 | A1* | 11/2003 | Liang ................... | G10L 15/25 704/231 |
| 2003/0212556 | A1* | 11/2003 | Nefian ................. | G10L 15/24 704/E15.041 |
| 2010/0082345 | A1* | 4/2010 | Wang ................... | G10L 13/00 704/E21.02 |
| 2012/0130717 | A1* | 5/2012 | Xu ....................... | G06T 13/40 345/473 |
| 2012/0280974 | A1* | 11/2012 | Wang ................... | G10L 21/10 345/419 |
| 2017/0061966 | A1* | 3/2017 | Marcheret ............ | G10L 21/02 |
| 2019/0130628 | A1* | 5/2019 | Cao ..................... | G10L 21/10 |
| 2019/0341054 | A1* | 11/2019 | Krupka ................ | G06V 10/454 |
| 2020/0110928 | A1* | 4/2020 | Al Jazaery ........... | G06V 20/48 |
| 2020/0117887 | A1* | 4/2020 | Chaudhuri ........... | G06N 5/046 |
| 2020/0160843 | A1* | 5/2020 | Shillingford ......... | G10L 15/24 |
| 2021/0065712 | A1* | 3/2021 | Holm ................... | G10L 17/18 |

OTHER PUBLICATIONS

Ibrahim etal, "Feature-fusion based audio-visual speech recognition using lip geometry features in noisy enviroment", 2015, ARPN J. Eng. Appl. Sci. 2015;10(23):17521-7.*

Li et al, "Lip reading using a dynamic feature of lip images and convolutional neural networks", 2016, In2016 IEEE/ACIS 15th International Conference on Computer and Information Science (ICIS) Jun. 26, 2016 (pp. 1-6). IEEE.*

Vakhshiteh et al., "Lip-reading via deep neural networks using hybrid visual features", Jul. 2018, Image Analysis & Stereology. Jul. 9, 2018;37(2):159-71.*

Addarrazi et al., "Amazigh audiovisual speech recognition system design", 2017, In2017 Intelligent Systems and Computer Vision (ISCV) Apr. 17, 2017 (pp. 1-5). IEEE.*

Muda et al., "Voice recognition algorithms using mel frequency cepstral coefficient (MFCC) and dynamic time warping (DTW) techniques", 2010, arXiv preprint arXiv:1003.4083. Mar. 22, 2010.*

Potamianos et al, "Recent advances in the automatic recognition of audiovisual speech", 2003, Proceedings of the IEEE. Sep. 8, 2003;91(9):1306-26.*

Noda etal, "Audio-visual speech recognition using deep learning", 2015, Applied Intelligence. Jun. 2015;42(4):722-37.*

Chen et al, "Speech-assisted lip synchronization in audio-visual communication", 1995, InProceedings., International Conference on Image Processing Oct. 23, 1995 (vol. 2, pp. 579-582). IEEE.*

Tomasi et al, "Bilateral filtering for gray and color images", 1998,. InSixth international conference on computer vision (IEEE Cat. No. 98CH36271) Jan. 7, 1998 (pp. 839-846). IEEE.*

Torfi et al, "3d convolutional neural networks for cross audio-visual matching recognition", 2017, IEEE Access. Oct. 9, 2017;5:22081-91.*

Shillingford et al, "Large-scale visual speech recognition", Oct. 2018, arXiv preprint arXiv:1807.05162. Jul. 13, 2018.*

Yasui et al, "Multimodal speech recognition using mouth images from depth camera", 2017, In2017 Asia-Pacific Signal and Information Processing Association Annual Summit and Conference (APSIPA ASC) Dec. 12, 2017 (pp. 1233-1236). IEEE.*

Wang et al, "Audio-visual speech recognition integrating 3D lip information obtained from the Kinect", 2016, Multimedia Systems. Jun. 2016;22(3):315-23.*

* cited by examiner

VOICE COMMANDS RECOGNITION METHOD AND SYSTEM BASED ON VISUAL AND AUDIO CUES

CROSS-REFERENCE TO RELATED APPLICATIONS

This application claims the benefits of United-States provisional patent application No. 62/781,589 filed on Dec. 18, 2018, which is herein incorporated by reference.

TECHNICAL FIELD

The present disclosure relates to a voice commands recognition method and system based on visual and audio cues.

BACKGROUND

Variations in user's pronunciation as well as the presence of background noises affect the performance of most present-day voice recognition systems and methods.

Therefore, there is a need for an improved voice commands recognition method and system.

SUMMARY

There is provided a method for voice commands recognition, the method comprising the steps of:
 a) obtaining an audio/video recording of a user issuing vocal commands;
 b) extracting video features from the audio/video recording, the video features extraction including the sub-steps of:
  c) creating a 3D model of facial movements of the user from the video portion of the audio/video recording;
  d) extracting a mouth area of the user from the 3D model;
  e) isolating mouth movements of the mouth area;
  f) extracting lip coordinates from the mouth movements;
  g) storing the lip coordinates in a first matrix;
 h) extracting audio features from the audio/video recording, the video features extraction including the sub-steps of:
  i) extracting mel-frequency cepstral coefficients from the audio portion of the audio/video recording;
  j) storing mel-frequency cepstral coefficients in a second matrix;
 k) applying a speech-to-text engine to the audio portion of the audio/video recording and storing the resulting syllables in a text file;
 l) identifying the vocal commands of the user based on the first matrix, the second matrix and the text file.

In one embodiment step a) of the voice commands recognition method is performed for a plurality of audio/video recordings with sub-steps c) to f) being performed for each of the audio/video recordings, and in step g) the lip coordinates having the most datapoints is stored in the first matrix.

There is also provided a system for voice commands recognition, the system comprising:
 a video camera and a microphone for producing an audio/video recording of a user issuing vocal commands;
 at least one processor operatively connected to the video camera and the microphone, the at least one processor having an associated memory having stored therein processor executable code that when executed by the at least one processor performs the steps of:
 a) obtain the audio/video recording from the video camera and the microphone;
 b) extract video features from the audio/video recording, the video features extraction including the sub-steps of:
  c) create a 3D model of facial movements of the user from the video portion of the audio/video recording;
  d) extract a mouth area of the user from the 3D model;
  e) isolate mouth movements of the mouth area;
  f) extract lip coordinates from the mouth movements;
  g) store in the associated memory the lip coordinates in a first matrix;
 h) extract audio features from the audio/video recording, the video features extraction including the sub-steps of:
  i) extract mel-frequency cepstral coefficients from the audio portion of the audio/video recording;
  j) store in the associated memory mel-frequency cepstral coefficients in a second matrix;
 k) apply a speech-to-text engine to the audio portion of the audio/video recording and store in the associated memory the resulting syllables in a text file;
 l) identify the vocal commands of the user based on the first matrix, the second matrix and the text file.

In one embodiment the system for voice commands recognition includes a plurality of video cameras and in step a) an audio/video recording is obtained from each of the plurality of video cameras and sub-steps c) to f) are performed for each of the audio/video recordings, step g) storing the lip coordinates having the most datapoints in the first matrix.

In another embodiment the system for voice commands recognition further comprises a proximity sensor and step a) is initiated once the presence of the user is detected by the proximity sensor.

In another embodiment sub-step f) of the voice commands recognition method and system further includes applying a bilateral filter to the isolated mouth movements of the mouth area before extracting lip coordinates from the mouth movements.

In a further embodiment the bilateral filter is applied to the isolated mouth movements of the mouth area until the extracted lip coordinates from the mouth movements correspond to reference lip coordinates from a reference lip coordinates data set within a predetermined confidence level.

In another embodiment sub-step i) of the voice commands recognition method and system the extracted mel-frequency cepstral coefficients include:
 a sampling frequency of the audio portion;
 a length each frame in seconds of the audio portion;
 a step between successive frames in seconds;
 a number of Fast Fourier Transform points;
 a lowest band edge of mel filters in Hz;
 a highest band edge of mel filters in Hz; and
 a number of cepstral coefficients.

In another embodiment sub-steps c) to f) and step l) of the voice commands recognition method and system are performed using a neural network.

In a further embodiment the neural network consists of fully connected layers, each of the connected layers representing a pre-trained syllable and every neuron representing corresponding lip coordinates, the neural network comparing each neuron with the stored lip coordinates in order to identify the syllable associated with the layer having the most neurons corresponding to the stored lip coordinates.

BRIEF DESCRIPTION OF THE FIGURES

Embodiments of the disclosure will be described by way of examples only with reference to the accompanying drawings, in which.

Similar references used in different Figures denote similar components.

DETAILED DESCRIPTION

Generally stated, the non-limitative illustrative embodiments of the present disclosure provide a voice commands recognition method and system based on visual and audio cues. The disclosed method and system can be used in any application activated or operated by voice commands, especially in noisy environments. In one illustrative embodiment, the voice commands recognition method and system based on visual and audio cues is used in the context of a restaurant drive-through where a driver orders food from a menu board from their car window.

Figure 1:
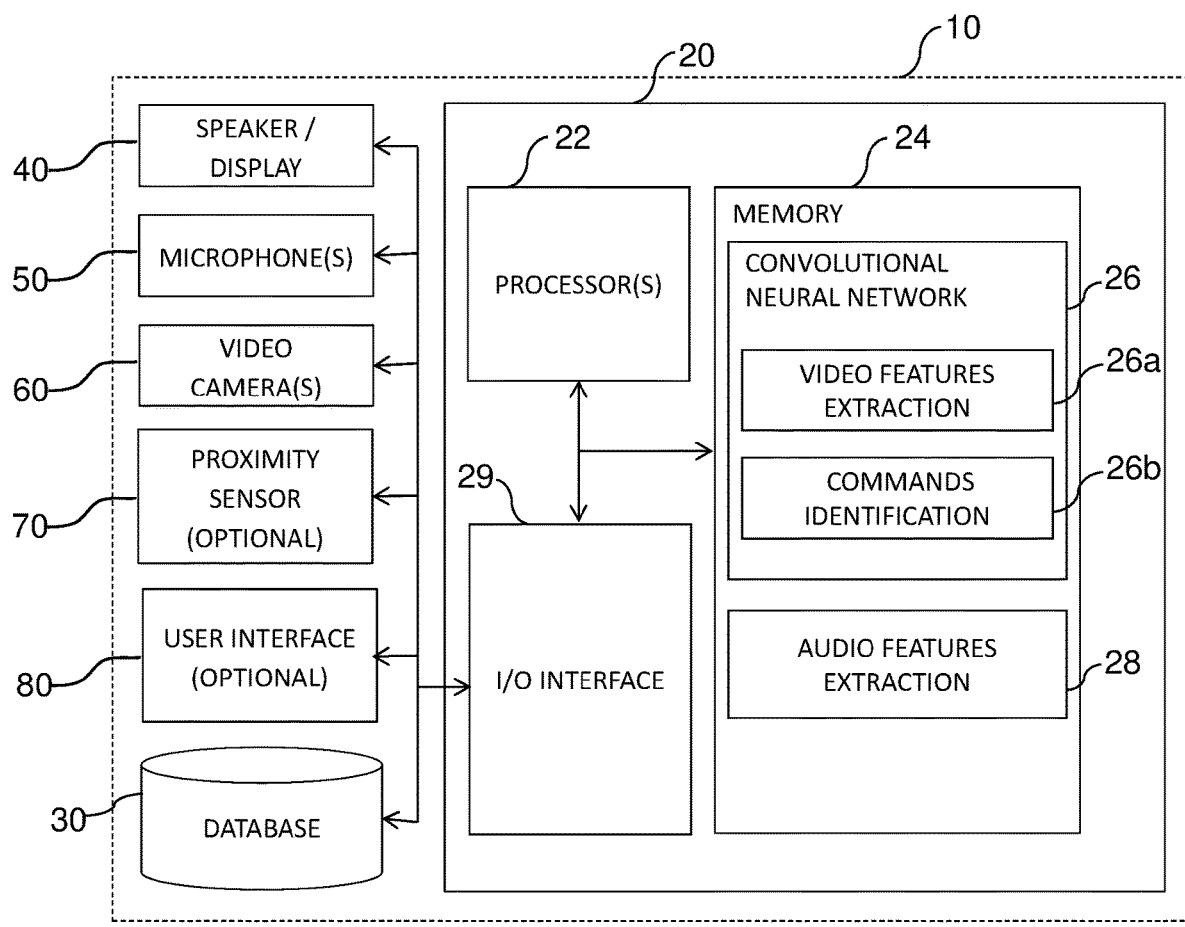
FIG. 1 is a schematic representation of the voice commands recognition system based on visual and audio cues in accordance with an illustrative embodiment of the present disclosure.

Referring to FIG. 1, the voice commands recognition system 10 includes a processing unit 20 having one or more processor 22 with an associated memory 24 having stored therein processor executable instructions 26 and 28 for configuring the one or more processor 22 to execute video features extraction 26a, commands identification 26b and audio features extraction 28 processes. The video features extraction 26a and the commands identification 26b processes are implemented as a convolutional neural network 26. It is to be understood that other processes, libraries and tools' executable instructions may be stored in the memory 24 in order to support processes 26a, 26b and 28. The processing unit 20 further includes an input/output (I/O) interface 29 for communication with a database 30, a speaker and/or display 40, one or more microphone 50, one or more video camera 60 (preferably provided with infrared lighting and viewing from different angles when more than one camera is in use), an optional proximity sensor 70 and an optional user interface 80. The optional user interface 80 may include, for example, any one or combination of a touch screen, keyboard, mouse, trackpad, joystick, gesture interface, scanner, etc.

Figure 2A:
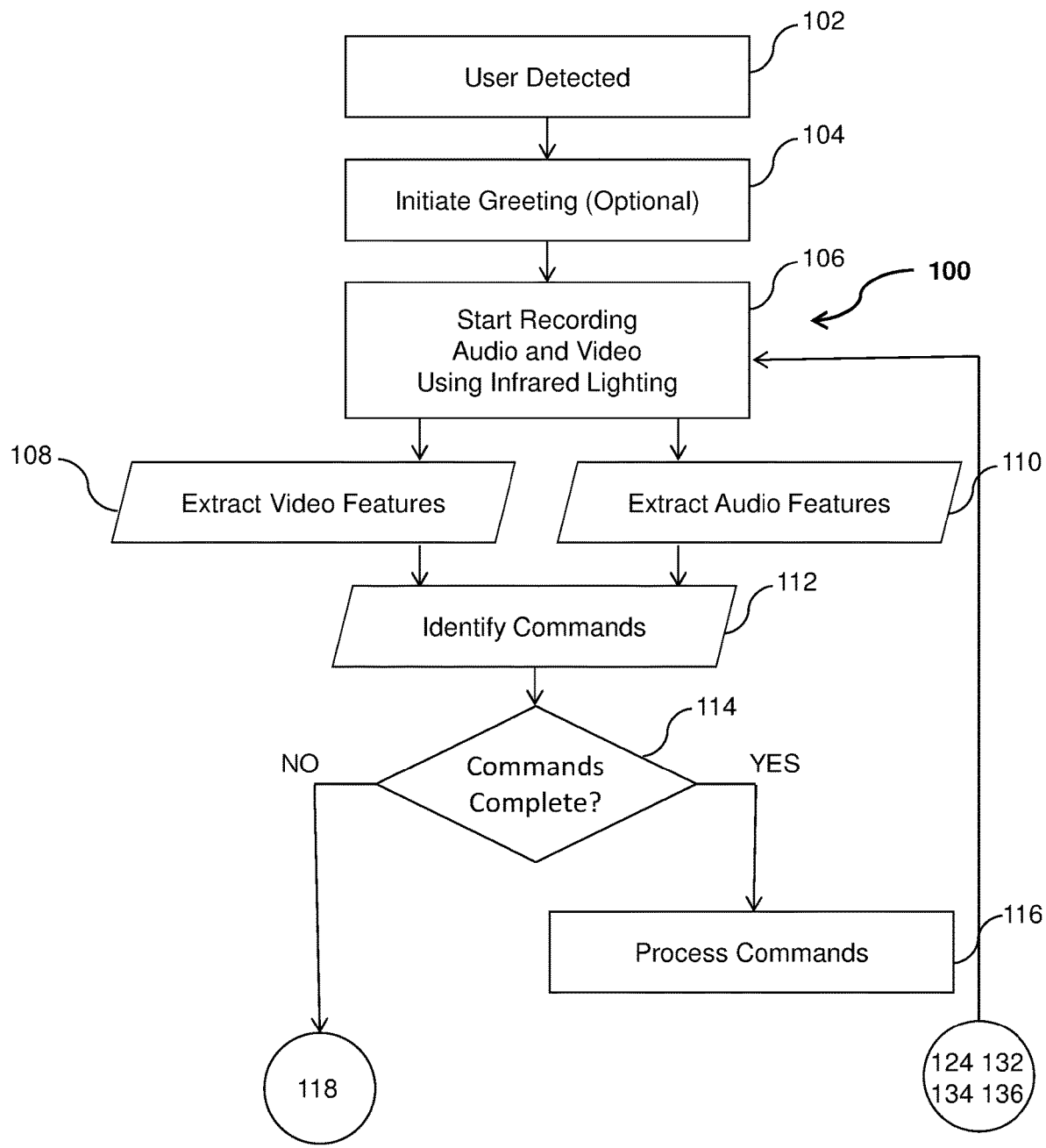
FIGS. 2A and 2B are a flow diagram depicting the voice commands recognition method based on visual and audio cues in accordance with the illustrative embodiment of the present disclosure.
Figure 2B:
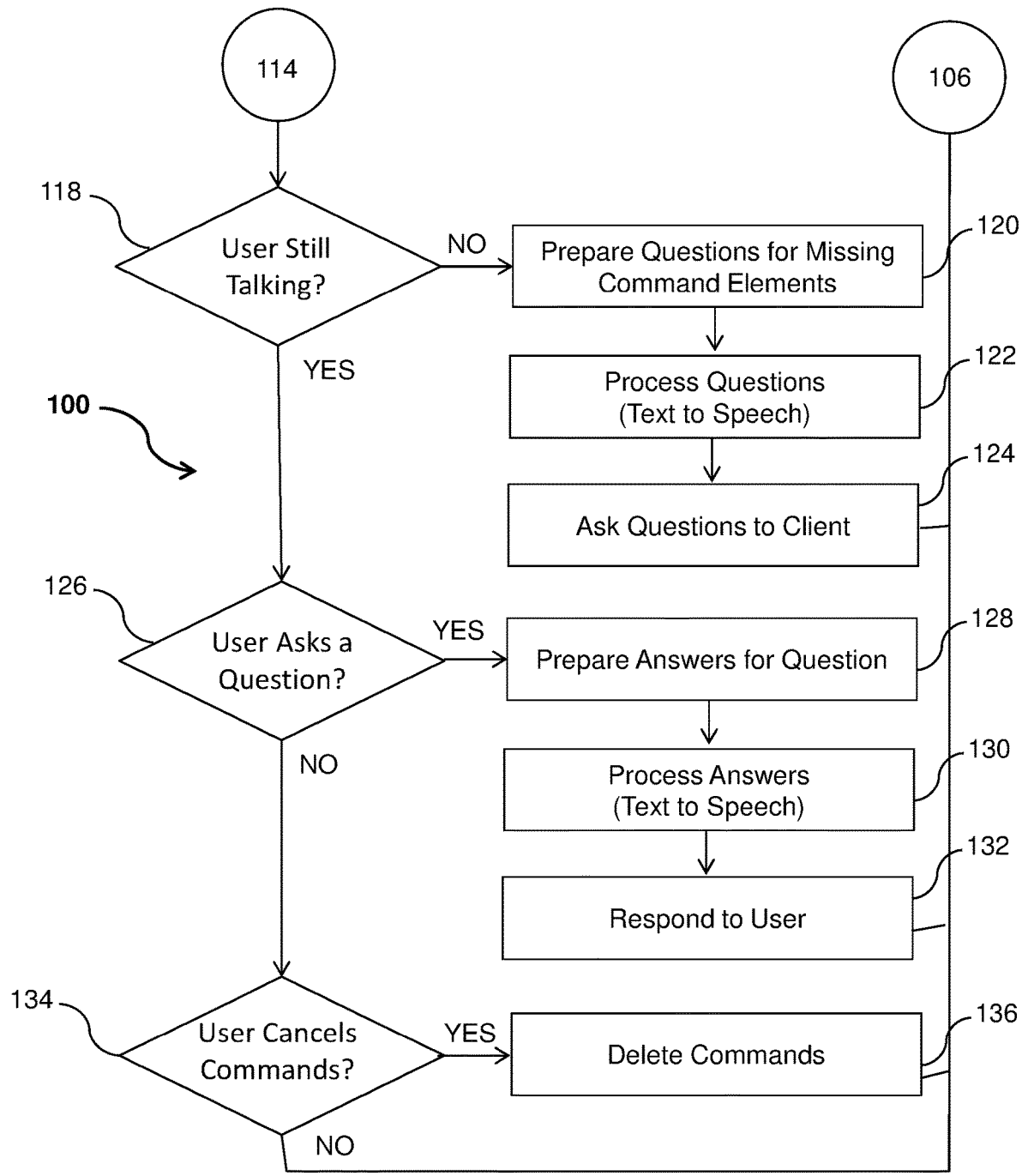

Referring now to FIGS. 2A and 2B, there is shown a flow diagram of the real time process 100 of the voice commands recognition method based on visual and audio cues in accordance with the illustrative embodiment of the present disclosure. Steps of the process 100 are indicated by blocks 102 to 136.

The process 100 starts at block 102 where the presence of a user is detected, for example using audio/visual cues via the one or more microphone 50 and/or video camera 60, optional proximity sensor 70 or a combination thereof (see FIG. 1). In an alternative embodiment the user may manually initiate the process 100 via the optional user interface 80.

Optionally, at block 104, the process 100 initiates a greeting to the user via the speaker/display 40, which may include instructions on how to use the voice commands recognition system 10.

At block 106, the process 100 initiates the one or more microphone 50 and video camera 60 audio and video recording. The video recording is then provided to block 108 while the audio recording is provided to block 110.

At block 108, the uncompressed video recording is pre-processed to have an equal frame rate of, for example 30 frames per second, and is then inputted into the convolutional neural network 26 video features extraction process 26a in order to create a 3D model of the user's facial movements, extract the mouth area from the 3D model (i.e. outer upper lip, inner upper lip, outer lower lip, inner lower lip and tongue contour if visible) and isolating the mouth movements from the video recording received in input. In the case where multiple video cameras 60 are used, the uncompressed video recording of each video camera 60 is inputted into the convolutional neural network 26 video features extraction process 26a and the resulting mouth area 3D model with most datapoints is retained. It is to be understood that in alternative embodiments the frame rate may be different and various other post-processing may be performed on the uncompressed video recording prior to its inputting into the convolutional neural network 26. Details regarding the convolutional neural network 26 video features extraction process 26a will be given further below.

At block 110, the audio recording of the uncompressed video recording is inputted into audio features extraction process 28 where the audio is extracted from the video recording using, for example, using the FFmpeg framework. The extracted audio is first filtered and enhanced to eliminate unnecessary background noise and is then split into frames, for example frames of a duration of 20 milliseconds. After the frames are split into the desired length, the following mel-frequency cepstral coefficients (MFCC) features are extracted from each frame and stored in memory 24:

the sampling frequency of the signal received;
the length of each frame in seconds (in the illustrative embodiment the default is 0.02 s);
the step between successive frames in seconds (in the illustrative embodiment the default is 0.02 s in order to avoid audio frames overlapping);
the number of FFT points (in the illustrative embodiment the default is 512);
the lowest band edge of mel filters in Hz (in the illustrative embodiment the default is 0);
the highest band edge of mel filters in Hz (in the illustrative embodiment the default is the sample rate/2); and
the number of cepstral coefficients.

Simultaneously, the extracted audio recording is passed through a speech-to-text engine using the Hidden Markov Model (HMM) to convert the audio recording into written text. A preliminary filter is then applied to the resulting text to remove useless words. For example, a dictionary of application specific and/or common sentences and words can be used to eliminate words that add no context to what the used is saying. In the context of the illustrative embodiment, i.e. a restaurant drive-through, sentences and words such as "can I have a" or "please" and "thank you" can be removed, the removal of which reduces the processing time exponentially. The remaining words are then split into syllables that get time stamped at the audio frame that they were heard at. The time stamped text is also stored in memory 24, separately from the extracted MFCC features.

Then, at block 112, the video features from block 108 and the audio features from block 110 are inputted into the convolutional neural network 26 commands identification process 26b in order to determine what were the vocal commands issued by the user. Two two-dimensional matrices are created, each having their own set of data stored in the memory 24.

The first matrix stores the set of lip coordinates per analyzed frame (from block 108). It stores the data in appending mode, so the empty matrix appends to itself an array of coordinates at every frame.

The second matrix stores the MFCC features of the audio of the analyzed frames (from block 110). It stores the data in appending mode, so the empty matrix appends to itself an array of MFCC features at every frame.

The two sets of data for each frame of the video recording are located at the same relative matrix position in the memory 24. The first matrix has the lip coordinates of the same frame whose audio information is stored in the corresponding position in the second matrix. For example, let the first matrix be A[ ] and the second matrix be B[ ], then the lip coordinates at A[i,j] and the MFCC features at B[i,j] correspond to the same video recording frame.

A separate text file contains every relevant syllable said by the user, written in text, along with a timestamp of when syllable appeared in the recorded audio is also stored in the memory 24.

The commands are then identified using the first and second matrices, along with the text file. Any commands (i.e. words) that were either unidentifiable or for which the identification confidence level is too low are flagged. The confidence level is defined by a function that compares the data points found on the user's lips with reference data points in memory 24. The reference data points are obtained by training the commands identification process 26b with actors saying expected vocal commands. The minimum confidence level can be set depending on the application. For example, in the illustrative embodiment, the confidence level may be set to 35%. Accordingly, to confirm that a specific command is being said, the lip coordinates need to match previous data by 35%. It is to be understood that the confidence level may vary depending on the complexity of the commands, the language used, environmental conditions, etc.

Details regarding the convolutional neural network 26 commands identification process 26b will be given further below.

At block 114, the process 100 verifies if the commands are complete, i.e. if the user has stopped issuing vocal commands and all commands have been identified. This can be accomplished by waiting for a predetermined time period, for example three seconds, and if no audio command is heard within that time period the process 100 asks the user "will that be all" via the speaker/display 40 and waits for confirmation to move on. If so, it proceeds to block 116 where the commands are processed. If not, the process 100 proceeds to block 118.

At block 118, the process 100 verifies if the user is still talking (for example if no audio command is heard within a predetermined time period). If not, it proceeds to block 120 where it prepares questions for any missing command elements (if applicable, otherwise it proceeds back to block 106), i.e. words flagged at block 112. For example, in the context of the illustrative embodiment, i.e. a restaurant drive-through, some of or all the commands can have associated parameters such as size, hot or cold, etc., so the process 100 verifies if those command elements were detected. At block 122, the questions are processed (e.g. requests for the missing command elements), for example by applying a text-to-speech algorithm and, at block 124, the questions are asked to the user via the speaker/display 40. In an alternative embodiment the questions may be simply displayed in text form on the speaker/display 40 (thus not requiring block 122) or the questions may be both asked vocally and displayed in text form. The process then proceeds back to block 106.

If the user is still talking, the process 100 proceeds to block 126 where it verifies if the user is asking a question. If so, it proceeds to block 128 where it prepares answers to the user's questions. In order to do so, the process accesses a dictionary of interrogation words stored in the memory 24, for example words like "how much", "what is", "what do", etc. After the process 100 detects a combination of these words, it assumes the user is asking a question about the subject of the sentence. By default, in the illustrative embodiment, the process 100 assumes that any question will be related to the price of the subject unless otherwise specified. For example, the sentence "how much are the fries" will return the price of the fries. The sentence "how many calories are in your burger" would return the number of calories in a burger because the subject of the question is "calories" and the detected item is "burger". At the end of every answer, the process 100 asks "did that answer your question". If the user replies "no", then the process 100 will connect to an employee (for example via a Bluetooth headset) who can answer the question.

At block 130 the answers are processed, for example by applying a text-to-speech algorithm and, at block 132, the answers are provided to the user via the speaker/display 40. In an alternative embodiment the answers may be simply displayed in text form on the speaker/display 40 (thus not requiring block 130) or the answers may be both provided vocally and displayed in text form. The process then proceeds back to block 106.

If the user is not asking a question, the process 100 proceeds to block 134 where it verifies if the user cancels the commands it has previously issued. This can be accomplished in different ways, in the illustrative embodiment the process 100 can detect that the user has driven away using audio/visual cues via the one or more microphone 50 and/or video camera 60, optional proximity sensor 70 or a combination thereof (see FIG. 1). This can also be accomplished by detecting predefined negative words such as "remove" in a command, the process 100 verifies if the user is trying to remove an item from his order or if he is trying to remove his whole order. If the sentence is something along the lines of "never mind my order" or simply "never mind", the process 100 assumes the user lost interest in his order because it couldn't detect an item in the sentence. If so, it proceeds to block 136 where it deletes the commands identified at block 122 and proceeds back to block 106. If the user does not cancel the commands it has previously issued, the process proceeds back to block 106.

Convolutional Neural Network
Video Features Extraction Process

The convolutional neural network 26 video features extraction process 26a uses a bilateral filter to smooth out useless details that can interfere with video features extraction process 26a, for example skin imperfections. The bilateral filter is defined as:

$$I^{filtered}(x) = \frac{1}{W_p} \sum_{x_i \in \Omega} I(x_i) f_r(\|I(x_i) - I(x)\|) g_s(\|x_i - x\|),$$

Where:
$I^{filtered}$ is the filtered image;
I is the original input image to be filtered;
x are the coordinates of the current pixel to be filtered;

Ω is the window centered in x;

$f_r$ is the range kernel for smoothing differences in intensities; and $g_s$ is the spatial kernel for smoothing differences in coordinates.

The Sobel—Feldman operator is then used to detect edges, crop the mouth and detect those precise areas. Where "A" is the original image and Gx and Gv are convolutional kernels:

$$G_x = \begin{bmatrix} +1 & 0 & -1 \\ +2 & 0 & -2 \\ +1 & 0 & -1 \end{bmatrix} *A \text{ and } G_y = \begin{bmatrix} +1 & +2 & +1 \\ 0 & 0 & 0 \\ -1 & -2 & -1 \end{bmatrix} *A$$

Due to the complexity of the inputted images, a stride of 3 is used for the applied filter, which is applied as many times as required so that all desired features are extracted, i.e. every time the filter is applied, lip detection is performed if not insufficient data points are detected then the filter is applied once more. Generally, the outer upper lip, the inner upper lip, the inner lower lip and the outer lower lip need to be identified in order to have enough data points.

A binary filter is also used to isolate different areas and convert the inputted video feed to gray scale. This can be accomplished, for example, by using the ITU-R 601-2 luma transform with the following parameters: R*299/1000+G*587/1000+B*114/1000.

The areas are then traced over with a series of dots. The dots are then positioned on a 2D plane to extract the positioning information from the mouth seen in the video frame. The information for every frame is stored in the memory 24 by mouth area.

After multiple pooling layers used to compress and shorten the results, the outcome is then flattened and inputted to the convolutional neural network 26 commands identification process 26b at block 112 (see FIG. 2A).

Commands Identification Process

The convolutional neural network 26 commands identification process 26b uses pre-determined data sets built while the convolutional neural network 26 is in a supervised training mode. The supervised training mode will be further detailed below.

The commands identification process 26b consists of a few fully connected layers, each of them representing a pre-trained syllable. Every neuron of the flattened mouth area features obtained from the video features extraction process 26a holds an equal power of vote. Each neuron gets compared to every registered lip movement (the connected layers) and returns the layer it resembles the most.

The commands identification process 26b then returns the sound most likely to have been pronounced along with its probability.

Training

The convolutional neural network 26 has the capability to train itself in order increase it accuracy and performance over time. To this end there are two training modes available: supervised and unsupervised training.

Supervised Training

A technician supervises a user in order to correct any potential mistakes made by the convolutional neural network 26. For example, if the convolutional neural network 26 is used as a drive-through machine for a fast-food chain, the technician would be an employee of the establishment listening to the user commands and pretend it is interacting directly with the user, punching in the correct desired items. This creates training data to be used by the convolutional neural network 26.

For example, if a user were to say: "I would like a Bug Mac" to the convolutional neural network 26, the processed output would contain the syllables "Bug" and "Mac" and timestamp when they appeared in the recorded audio. An employee working at McDonalds restaurants would know the user meant "Big Mac" and punch that item in the voice commands recognition system 10 (see FIG. 1). The convolutional neural network 26 would then compare the employee's inputs with the user's inputs and assume the employee is correct. It then corrects the previously extracted syllable "Bug" with "Big" and leaves the original timestamp.

The convolutional neural network 26 will now have the lip movements associated with the sound "Bug Mac" and will be able to associate them in the future to the item "Big Mac". This method of training allows the convolutional neural network 26 to generate its own training data in order increase it accuracy and performance over time.

The corrected and training data is stored in the database 30, so that the convolutional neural network 26 can use it later in the unsupervised training mode.

Unsupervised Training

When the convolutional neural network 26 has gone through multiple supervised training iterations, each generating associated training data sets saved in the database 30, then the convolutional neural network 26 can operate in the unsupervised training mode using those training data sets.

When the convolutional neural network 26 is in this training mode and a user speaks in front of the microphone (s) 50 and video camera(s) 60, the voice commands recognition process 100 (see FIGS. 2A and 2B) will proceed as usual. However, it will take the lip coordinates of an uttered syllable and, through the convolutional neural network 26, compare every group of dots with the previously obtained trained data sets for that precise syllable.

For example, if the convolutional neural network 26 is used in the context of a drive-through machine for a fast-food chain, a user might tell say: "I would like a Big Mac". The syllable "Big" and the user's lip coordinates are inputted into the convolutional neural network 26, which then compares the coordinates with other training data sets, stored in the database 30, from other users who have said the syllable "Big".

If the output of the commands identification process 26b has a probability score lower than a certain threshold, then the user is asked, at block 124 of FIG. 2B, to repeat what he said due to miscomprehension. It will then replace the erroneous lip coordinates with the newly acquired ones.

In the case where the commands identification process 26b identifies the wrong word, say "bug" instead of "big", the lip coordinates of "bug" will still correspond to "big" because that error was corrected previously in the supervised training mode. The convolutional neural network 26 then corrects the recorded word "bug" with "big" if the commands identification process 26b produce an output having a probability score higher than a certain threshold.

When the voice commands recognition system 10 is left idle for a certain period of time or when a user gives it the command, it runs a first order optimization technique known as the Gradient Descent on the newly obtained data sets. It is used to minimize the loss function and is trained via back propagation. A derivative of the gradient decent known as the Adaptive Moment Estimation (ADAM) is used. In addition to storing an exponentially decaying average of past squared gradients ADAM also keeps an exponentially decaying average of past gradients.

Although the present disclosure has been described with a certain degree of particularity and by way of an illustrative embodiments and examples thereof, it is to be understood that the present disclosure is not limited to the features of the embodiments described and illustrated herein, but includes all variations and modifications within the scope of the disclosure as hereinafter claimed.

What is claimed is:

1. A method for voice commands recognition, the method comprising the steps of:
 a) obtaining an audio/video recording of a user issuing vocal commands;
 b) extracting video features from the audio/video recording, the video features extraction including the sub-steps of:
  c) creating a 3D model of facial movements of the user from the video portion of the audio/video recording;
  d) extracting a mouth area of the user from the 3D model;
  e) isolating mouth movements of the mouth area;
  f) extracting lip coordinates from the mouth movements;
  g) storing the lip coordinates in a first matrix;
 h) extracting audio features from the audio/video recording, the video features extraction including the sub-steps of:
  i) extracting mel-frequency cepstral coefficients from the audio portion of the audio/video recording;
  j) storing mel-frequency cepstral coefficients in a second matrix;
  k) applying a speech-to-text engine to the audio portion of the audio/video recording and storing the resulting syllables in a text file;
 l) identifying the vocal commands of the user based on the first matrix, the second matrix and the text file:
  wherein sub-steps c) to f) and step l) are performed by a neural network consisting of fully connected layers, each of the connected layers representing a pre-trained syllable and every neuron representing corresponding lip coordinates, the neural network comparing each neuron with the stored lip coordinates in order to identify the syllable associated with the layer having the most neurons corresponding to the stored lip coordinates.

2. A method for voice commands recognition according to claim 1, wherein in step a) a plurality of audio/video recordings are obtained and sub-steps c) to f) are performed for each of the audio/video recordings, and step g) storing the lip coordinates having the most datapoints in the first matrix.

3. A method for voice commands recognition according to claim 1, wherein in sub-step i) the extracted mel-frequency cepstral coefficients include:
 a sampling frequency of the audio portion;
 a length each frame in seconds of the audio portion;
 a step between successive frames in seconds;
 a number of Fast Fourier Transform points;
 a lowest band edge of mel filters in Hz;
 a highest band edge of mel filters in Hz; and
 a number of cepstral coefficients.

4. A method for voice commands recognition, the method comprising the steps of:
 a) obtaining an audio/video recording of a user issuing vocal commands;
 b) extracting video features from the audio/video recording, the video features extraction including the sub-steps of:
  c) creating a 3D model of facial movements of the user from the video portion of the audio/video recording;
  d) extracting a mouth area of the user from the 3D model;
  e) isolating mouth movements of the mouth area;
  f) applying a bilateral filter to the isolated mouth movements of the mouth and extracting lip coordinates from the filtered mouth movements until the extracted lip coordinates from the mouth movements correspond to reference lip coordinates from a reference lip coordinates data set within a predetermined confidence level;
  q) storing the lip coordinates in a first matrix;
 h) extracting audio features from the audio/video recording, the video features extraction including the sub-steps of:
  i) extracting mel-frequency cepstral coefficients from the audio portion of the audio/video recording;
  j) storing mel-frequency cepstral coefficients in a second matrix;
  k) applying a speech-to-text engine to the audio portion of the audio/video recording and storing the resulting syllables in a text file;
 l) identifying the vocal commands of the user based on the first matrix, the second matrix and the text file.

5. A system for voice commands recognition, the system comprising:
 a video camera and a microphone for producing an audio/video recording of a user issuing vocal commands;
 at least one processor operatively connected to the video camera and the microphone, the at least one processor having an associated memory having stored therein processor executable code that when executed by the at least one processor performs the steps of:
  a) obtain the audio/video recording from the video camera and the microphone;
  b) extract video features from the audio/video recording, the video features extraction including the sub-steps of:
   c) create a 3D model of facial movements of the user from the video portion of the audio/video recording;
   d) extract a mouth area of the user from the 3D model;
   e) isolate mouth movements of the mouth area;
   f) extract lip coordinates from the mouth movements;
   g) store in the associated memory the lip coordinates in a first matrix;
  h) extract audio features from the audio/video recording, the video features extraction including the sub-steps of:
   i) extract mel-frequency cepstral coefficients from the audio portion of the audio/video recording;
   j) store in the associated memory mel-frequency cepstral coefficients in a second matrix;
   k) apply a speech-to-text engine to the audio portion of the audio/video recording and store in the associated memory the resulting syllables in a text file;
  l) identify the vocal commands of the user based on the first matrix, the second matrix and the text file;

wherein sub-steps c) to f) and step l) are performed by a neural network consisting of fully connected layers, each of the connected layers representing a pre-trained syllable and every neuron representing corresponding lip coordinates, the neural network comparing each neuron with the stored lip coordinates in order to identify the syllable associated with the layer having the most neurons corresponding to the stored lip coordinates.

6. A system for voice commands recognition according to claim 5, wherein the system includes a plurality of video cameras and wherein in step a) an audio/video recording is obtained from each of the plurality of video cameras and sub-steps c) to f) are performed for each of the audio/video recordings, and step g) storing the lip coordinates having the most datapoints in the first matrix.

7. A system for voice commands recognition according to claim 5, further comprising a proximity sensor and wherein step a) is initiated once the presence of the user is detected by the proximity sensor.

8. A system for voice commands recognition according to claim 5, wherein in sub-step i) the extracted mel-frequency cepstral coefficients include:
   a sampling frequency of the audio portion;
   a length each frame in seconds of the audio portion;
   a step between successive frames in seconds;
   a number of Fast Fourier Transform points;
   a lowest band edge of mel filters in Hz;
   a highest band edge of mel filters in Hz; and
   a number of cepstral coefficients.

9. A system for voice commands recognition, the system comprising:
   a video camera and a microphone for producing an audio/video recording of a user issuing vocal commands;
   at least one processor operatively connected to the video camera and the microphone, the at least one processor having an associated memory having stored therein processor executable code that when executed by the at least one processor performs the steps of:
   a) obtain the audio/video recording from the video camera and the microphone;
   b) extract video features from the audio/video recording, the video features extraction including the sub-steps of:
      c) create a 3D model of facial movements of the user from the video portion of the audio/video recording;
      d) extract a mouth area of the user from the 3D model;
      e) isolate mouth movements of the mouth area;
      f) applying a bilateral filter to the isolated mouth movements of the mouth and extracting lip coordinates from the filtered mouth movements until the extracted lip coordinates from the mouth movements correspond to reference lip coordinates from a reference lip coordinates data set within a predetermined confidence level;
      g) storing the lip coordinates in a first matrix;
      g) store in the associated memory the lip coordinates in a first matrix;
   h) extract audio features from the audio/video recording, the video features extraction including the sub-steps of:
      i) extract mel-frequency cepstral coefficients from the audio portion of the audio/video recording;
      j) store in the associated memory mel-frequency cepstral coefficients in a second matrix;
      k) apply a speech-to-text engine to the audio portion of the audio/video recording and store in the associated memory the resulting syllables in a text file:
   l) identify the vocal commands of the user based on the first matrix, the second matrix and the text file.

\* \* \* \* \*